2 Sheets—Sheet 1.

M. GRUBE.

MACHINE FOR FIXING THREADS IN ENVELOPS.

No. 11,577. Reissued Dec. 8, 1896.

Witnesses:

W. H. Rowe

C. H. Schafer.

Inventor:-

Max Grube,

By his Atty. O. B. Reichelt.

2 Sheets—Sheet 2.
M. GRUBE.
MACHINE FOR FIXING THREADS IN ENVELOPS.
No. 11,577. Reissued Dec. 8, 1896.
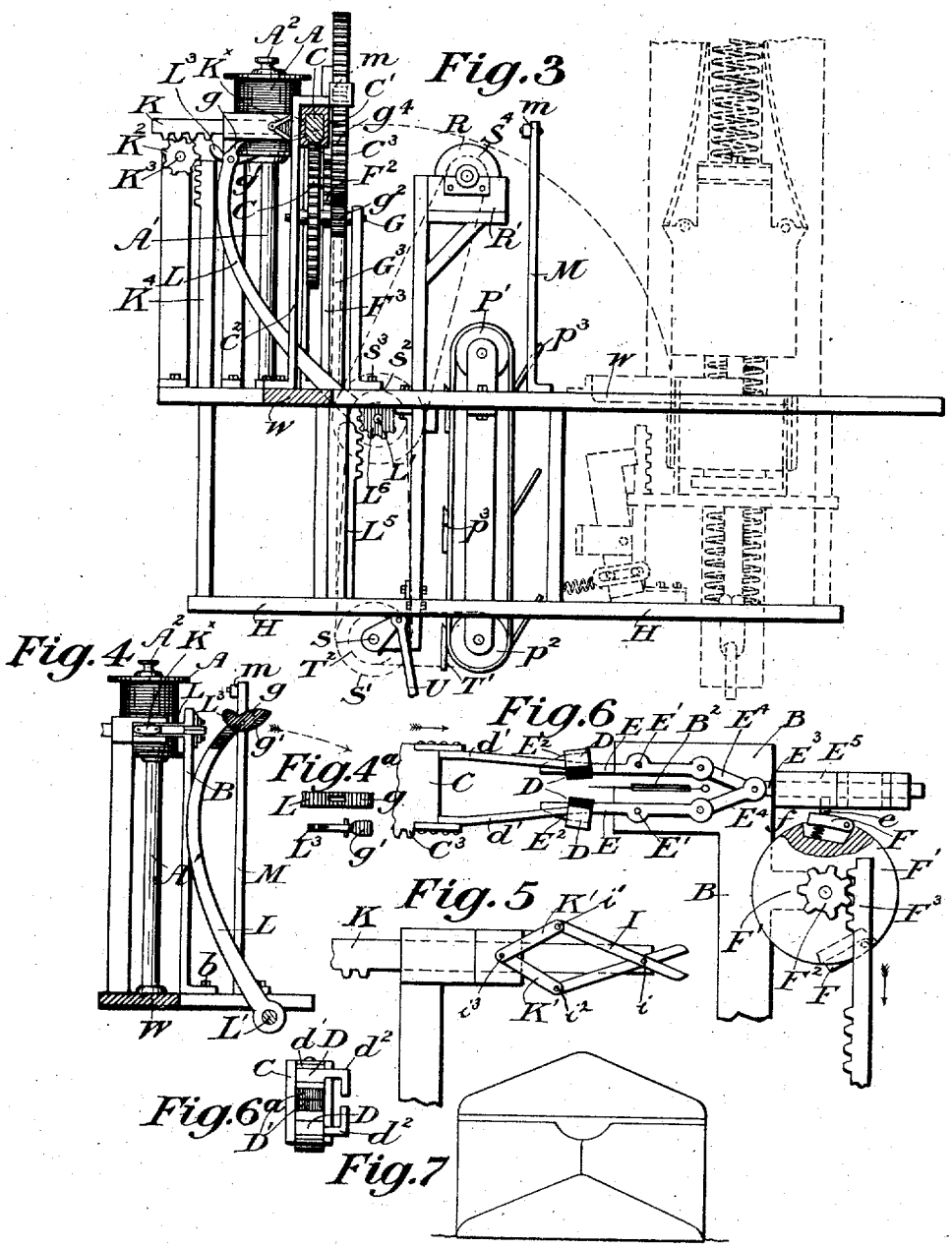
Witnesses:
O. H. Rowe
C. N. Schafer
Inventor.
Max Grube.
By his Atty. O. B. Reichelt

UNITED STATES PATENT OFFICE.

MAX GRUBE, OF SAN FRANCISCO, CALIFORNIA.

MACHINE FOR FIXING THREADS IN ENVELOPS.

SPECIFICATION forming part of Reissued Letters Patent No. 11,577, dated December 8, 1896.

Original No. 515,524, dated February 27, 1894. Application for reissue filed September 20, 1895. Serial No. 563,158.

*To all whom it may concern:*

Be it known that I, MAX GRUBE, a subject of the Emperor of Germany, residing at San Francisco, in the county of San Francisco, in the State of California, have invented certain new and useful Improvements in Machines for Fixing Threads in Envelops; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has for its object to produce a machine or device for attachment to envelop-machines to gum and lay threads in the creases of envelops at the time of manufacture.

The invention consists in certain parts and combination of parts comprising a thread-drawing mechanism operating to draw the threads from a spool in measured lengths, a pair of arms to seize the thread, deliver, and lay it in position in the creases or folds of the envelop-blanks before the envelops are folded down, and a cutting device to sever the threads from the spool. In connection with these parts there is provided an endless carrier to convey the finished envelop out of the machine. The several parts and mechanisms are connected and combined for joint operation and are adapted to work in proper time with as well as to be actuated from the folding mechanism of the envelop-machine to which it may be attached.

The accompanying drawings show the construction and arrangement of this attachment and also represent it as applied to an envelop-machine of the kind known as the "Flammer envelop-machine," which was patented to J. D. Flammer on the 2d day of September, 1890, No. 435,816; but this attachment can be applied to other styles of machines by making suitable connections between the actuating parts of the attachment and some moving part of the machine.

Figure 1:
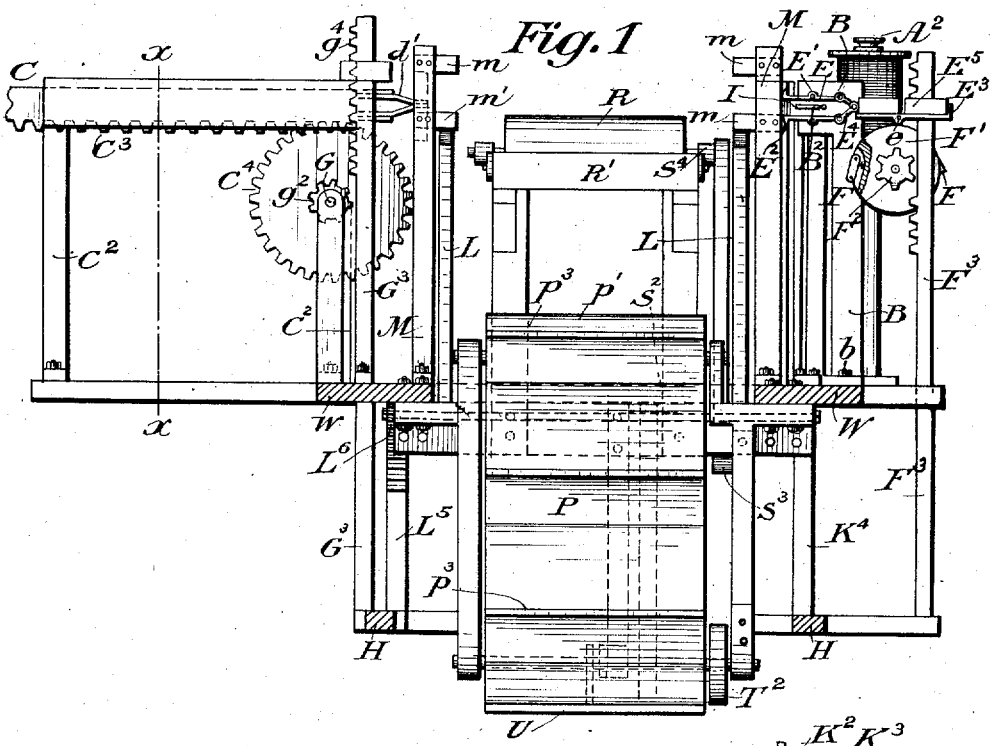
Figure 2:
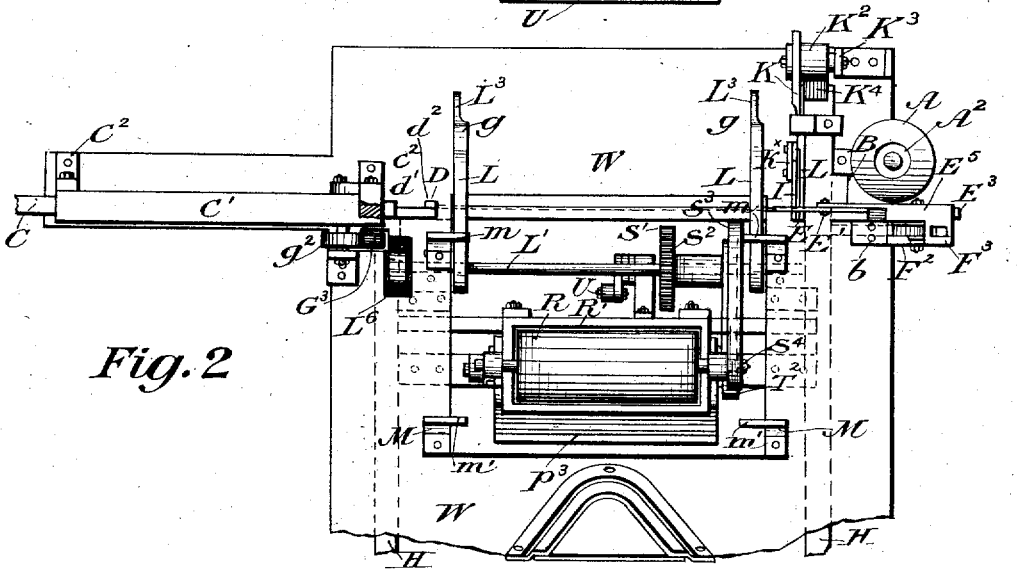

In the accompanying drawings, Figure 1 represents the attachment in side elevation and in position on a Flammer envelop-machine, parts of the machine being in section. Fig. 2 is a top view of the parts shown in Fig. 1 with the upper works of the machine above the table cut away. Fig. 3 is a front elevation of the attachment and a cross-section on the line $x$ $x$, Fig. 1; Fig. 4, an elevation of the thread-cutters and one of the clamping thread-carrying arms, the clamping-jaws thereof being shown in section. Fig. $4^a$ represents a top view of the holding-jaws of the thread-carrying arms. Fig. 5 is a detail view of the thread-cutter. Fig. 6 is a detail view showing the thread-nippers of the thread-delivery reciprocating bar and the mechanism for operating the same. Fig. $6^a$ is a side view of the thread-nippers of the thread-delivery device, the last three figures being on an enlarged scale. Fig. 7 is a view of the finished envelop with the thread therein.

Similar letters of reference indicate corresponding parts in all the figures where they occur.

A indicates a spool mounted on an upright pin A′, having a tension-nut and washer $A^2$ on the screw-thread to apply suitable tension to the spool.

B is a bracket fixed at the foot by screws $b$ $b$ to the base W of the attachment and having a thread-guide tube $B^2$.

C is a reciprocating bar of a thread-delivery nipper sliding in a slotted guide-rail C′, that is supported by brackets $C^2$ $C^2$ at the opposite side of the base W and in direct line with the thread-tube.

At the inner end the reciprocating bar C is provided with thread-seizing nippers consisting of the nipper-heads D and the flat springs $d'$, by which the heads are connected with the bar C and the purpose of which is to hold the same together. To the nipper-heads forming the jaws that seize and carry the thread across the table are attached small pieces of rubber D′ or other elastic or yielding material for the purpose of insuring and facilitating the hold on the thread. The nipper-heads extend at one side into loops $d^2$, fitted to take over the ends of a pair of levers E E, fixed on opposite sides of the thread-guide or above and beneath it against the side of the bracket. These levers operate to open the nippers and then allow them to close upon the end of the thread projecting from the guide-tube. They work on pivots E′, and their points or front ends $E^2$ are a short distance above the edges of the levers to take the first contact of the heads of the nippers and act to open said jaws as the bar C presses the loops $d^2$ over the levers in the motion toward the thread-guide. The loops allow the jaws to close upon the thread as soon as the projecting ends of the levers are pressed. (See Fig. 6.) During the return movement of the bar C the jaws keep closed upon the thread and carry it along across the table. The obstruction to the movement formed by the projecting ends $E^2$ is removed by bringing said ends together and out of the way of the loops $d^2$, through the medium of a sliding bar $E^3$, connected to the levers E by links $E^4$. The bar $E^3$ slides in a slotted guide-rail $E^5$, forming part of the bracket B, and has at the lower edge a projecting pin *e*. This pin is acted upon to produce the reciprocating motion of the bar $E^3$ by dogs F, pivoted to and situated in recesses of the circular disk F′ and held in place by springs *f*.

The operation of the levers E E is as follows: When it becomes necessary for the levers E E to operate to perform their proper function, the rack $F^3$ is given an upward motion, causing the disk F′, through the pinion $F^2$, to revolve, the lug or pin *e* on the bar $E^3$ is engaged by one of the pawls F in the circumference of the disk, and the bar $E^3$ driven forward, and, as the levers E E are pivoted at E′ E′ and are connected to the bar $E^3$ by the links $E^4$ $E^4$, the rear ends of these levers E E will be thrown apart as the bar $E^3$ advances, causing their forward ends to approach one another, thereby permitting the heads D of the bar C to be withdrawn from the forward ends $E^2$ of the levers E, as is evident. When the levers E are to be opened again in the performance of their proper function, the rack $F^3$ descends, causing the disk to revolve in the opposite direction, and the opposite pawl F in the disk F′ will engage the lug or pin on the bar $E^3$, when the reverse of the above operation will take place. The disk turns around a pin projecting from an arm of the bracket B. It connects with a pinion $F^2$, to which motion is imparted by the reciprocating bar $F^3$, having a rack with toothed portion with smooth portion between. The lower end of the bar is attached to a reciprocating frame H, which will be hereinafter more fully described. The movement is given to the bar C from a shaft G beneath it, and a rack $C^3$ on the bottom of the bar and a gear $C^4$ on the shaft, and being so arranged as to give the parts the required throw back and forth, the length of which movement will be governed by the length of the thread that is used for laying in the envelop. The shaft G is actuated in this construction by a pinion $g^2$ and a reciprocating upright bar $G^3$, having a rack or toothed portion with smooth portion above and below the toothed portion $g^4$ to clear the pinion. The lower end of this upright bar is attached to the reciprocating frame H, that is moved by the treadle-frame or part of the envelop-machine that operates the folding mechanism. In the machine herein shown and described the parts are operated by a treadle and the movements are reciprocating ones, and I therefore employ connecting means of suitable character to apply the same movement for actuating the several devices of the thread-fixing attachment. In machines having rotary shafts, however, the connections would be made between a shaft of the machine and a rotating shaft in the attachment by means of a belt or pulleys or by a set of gears suitably proportioned to obtain the required movements of the parts.

The parts that pertain to the envelop-machine proper are shown in dotted lines, Fig. 1, except the table W and the reciprocating frame H, which actuate the various parts of the envelop, as well as the parts of the thread-fixing machine, through the medium of the different rack-bars, two of which, $F^3$ and $G^3$, have heretofore been mentioned. A similar arrangement of reciprocating rack-bar pinion and shaft operates the thread-cutter on the same side of the attachment where the thread-spool is set, and also the oscillating fingers. The frame H receives the reciprocating motion from the treadle of the envelop-machine through the medium of a connecting-rod.

The cutter, Fig. 5, is composed of two pivoted blades I. The pivot-pin *i* of the cutting-blades is secured to the slide-bar K, near the end thereof, the cutting ends projecting beyond the end of said bar K, standing just back and to one side of the thread-guide tube, and the handle ends of the said cutting-blades are connected by pins $i'$ $i^2$ to links K′, pivoted to pins $i^3$, affixed to a stationary part of the machine, to be thus operated by the reciprocating bar K, so that, being projected forward and backward, the cutting edges will sever the thread at a point sufficiently beyond the end of the tube to leave the end portion of the thread standing beyond the tube to be seized by the thread-delivering nippers. This portion of the cutters is seen in Figs. 2 and 3, while their construction is shown more clearly in the enlarged detail Fig. 5. The cutter-operating bar has a toothed edge taking a spur-gear $K^2$ on a shaft $K^3$, to which rotary motion back and forth is given by the reciprocating bar $K^4$ of the frame H and the gear $K^2$ on the shaft $K^3$. These parts above described constitute the thread delivery and cutting devices that operate to pull the thread from a spool A at one side of the table and carry it across parallel with, but at some distance above as well as back of the crease or fold at the bottom of the envelop as it lies on the table of the machine. In this position of the thread, which is represented by the broken line, Fig. 2, it is held by the thread-delivery nippers at one side and by the spool at the opposite side ready to be seized by a pair of thread-holders upon the ends of carrier-arms L L, that swing in an arc from a center of movement L′ beneath the table W and in a vertical plane at right angles to and across the path of the thread-delivery bar. Movement is given to the arms L by the reciprocating rack $L^5$ on the frame and a mutilated pinion $L^6$ on the rock-shaft L′. The arms are fixed to the shaft at a suitable distance apart to seize the thread at points furnished with thread-holding jaws *g g′* on the upper ends, that are opened and closed at proper time in the movement of the arms by means of stops *m m′* on upright parts M upon the table. The thread-holder of each arm consists of a movable jaw *g′*, pivoted to the fixed jaw *g*, the movable jaw having a curved finger $L^3$, extending backward and projecting above the arms in such positions that, being brought in contact with the stop *m* in the movements of the arms, it is closed upon the thread at the beginning of the forward throw and is opened on the return movement by the stops *m′* to release the thread already attached to the envelop and be set to seize the next length of thread and carry it forward. The throw of these arms and the movement of the thread-cutters are so timed with respect to each other that the thread is cut from the spool as soon as the thread-holder jaws have closed upon the thread. Soon after the jaws *g g′* have taken hold of the thread they are closed upon it by the stop *m* and kept in that position by the friction existing between them. They describe an arc that ends at the crease or fold of the last-folded flap of the envelop as it lies under the folding mechanism of the machine, and the arms, completing such throw, remain at rest until the last flap of the envelop is folded down into place and the folding mechanism has released the finished envelop. When these operations of laying the thread and folding flaps are completed, the arms make the return movement and still hold the thread. They take the envelop from the table by the thread and carry it to an endless envelop-carrier P, where the thread-holders of the carrier-arms are opened by the stop *m′* to release the thread.

It will be observed that the thread-holder jaws *g g′* are held together by their own friction, which is very slight, and that upon a return of the arms L L to their normal position the jar of the reverse movement and the additional pull of the envelop will serve to open the jaws sufficient to bring the curved finger $L^3$ in contact with the stop *m′*, thereby causing the jaws *g g′* to be opened to their full extent and release the thread.

It is evident that the movement of the various rack bars and pinions are to be proportioned in such manner so as to impart to the different parts of the machine the proper motions at the proper time.

The envelop-carrier is an endless apron mounted on rollers $p'$ $p^2$, and provided with pockets or receptacles formed of boards $p^3$, that are hinged to the apron to open and stand outward on the front side, where they travel in a downward direction, and to close against the apron on the opposite side while traveling upward. The thread-holding jaws upon the carrier-arms are operated by the stop *m′* to open and discharge the envelop just as it arrives over the envelop-carrier, so that the receptacles catch the envelops and carry them to a point of discharge below the table out of the way.

A gumming device placed over the endless envelop-carrier operates to coat the thread with adhesive material while it is being carried forward to the envelop, and is composed of a roller R, journaled in a gum-trough $R^{\times}$ and rotated from a shaft S below by a series of belts and pulleys $S'$ $S^2$ $S^3$ $S^4$. The shaft from which this motion is obtained also connects with the lower roller of the endless carrier by a belt $T^2$, and the shaft itself is worked by a crank and pitman U from the treadle of the envelop-machine.

The gumming-roller is set with its periphery in such close relation to the path of the thread held in the holders in the ends of the carrier-arms that the thread touches the coating of adhesive substance on the roller just enough to become charged or covered with it. Thus in the forward movement of the arms the thread is carried over the roller and is gummed before it is laid upon the envelop-blank. In adjusting this thread carrying and laying mechanism to the envelop-machine it is necessary to regulate the movement of the folder that folds the last flap or bottom flap of the envelop, so that the arms carrying the thread into position shall not interfere with the folder and shall discharge and come to rest upon the table just in advance of the descent of the folder.

As thus constructed and arranged the attachment operates, in connection with the folding mechanism of the envelop-machine, to cut off a length of the thread, gum, and lay it in the fold of the envelop at the time of manufacture.

It will be readily seen that the thread is not gummed over its entire length, but between the thread-holder of the carrying-arms only, leaving the ends of the thread ungummed where it comes in contact with any surface or working part of the machine.

Having thus described my invention, I claim as new and desire to secure by Letters Patent—

1. An envelop-machine provided with a pair of thread-holders arranged opposite each other at each end of the envelop to apply the thread thereon, and a reciprocating thread-delivering nipper adapted to draw the thread between and deliver it to the thread-holders, substantially as shown and described.

2. In a machine for fixing threads in envelops, the combination with the envelop-holding table and frame, of a pair of thread-carriers provided with thread-holders, a reciprocating thread-delivering nipper having a rectilinear movement adapted to take hold of and lay a line of thread across from one thread-carrying holder to the other, a spool or bobbin supplying the thread to the delivering-nipper, a thread-cutter to sever the thread thus drawn, and mechanism to produce the movements of said parts, substantially as described.

3. An envelop-threading machine provided with a thread-supply, a reciprocating single thread-delivering nipper, a thread-gumming device and two thread-carriers, each having thread-holders to grasp the ungummed part of a partially-gummed thread and deliver it to a partially-folded envelop, substantially as described.

4. The combination with the flap-folding mechanism of an envelop-machine, of carrier-arms provided with thread-holders and mounted on a horizontal shaft to move in a circular path and deliver the thread to a partially-folded envelop, the spool-holder, the thread-guide, the reciprocating thread-delivering nipper having a rectilinear movement across the path described by the carrier-arm thread-holders, and a thread-cutter, these devices being actuated at proper intervals to draw and lay a thread from the supply-spool across the open thread-holders of the carrier-arms, sever the thread and finally by the forward movement of said carrier-arms to lay the thread upon the partially-folded envelop, substantially as set forth.

5. In a machine for fixing threads in envelops, the combination with the thread-supply, of an envelop-holding bed or platform, the thread-holders and a gumming device adapted to take a supply of adhesive material from a trough or receptacle and apply the same to the thread between the holders, substantially as described.

6. In a machine for fixing threads in envelops, the combination with the thread-carrying arms, thread-holders on the free ends thereof, means for opening and closing said thread-holders, an envelop-holding table, mechanism for folding the flap in position over the thread, and the endless envelop-carrier consisting of belts mounted on rollers, the boards forming compartments carried by said belts to receive the envelops from the thread-carrying arms and deliver them from the machine, substantially as described.

7. In a machine for fixing threads in envelops, the combination with the reciprocating bar C, of the thread-delivering nippers provided with spring-actuated thread-seizing nippers consisting of the heads D and loops $d^2$ extending on the side of heads D, a spool-holder, a thread-guide tube $B^2$ between the spool and the bar C, a pair of levers E, E, working on pivots E′, E′, having their front ends $E^2$ a short distance above the said levers and connected by links $E^4$, $E^4$, to a sliding bar $E^3$, and mechanism to produce the movements in relative time to each other as set forth.

MAX GRUBE.

Witnesses:
LEE D. CRAIG,
JOSEPH SCHULTZ.